United States Patent [19]

Bourrez

[11] 4,418,385
[45] Nov. 29, 1983

[54] METHOD AND DEVICE FOR ARBITRATION OF ACCESS CONFLICTS BETWEEN AN ASYNCHRONOUS TRAP AND A PROGRAM IN A CRITICAL SECTION

[75] Inventor: Jean-Marie Bourrez, Versailles, France

[73] Assignee: CII Honeywell Bull, Paris, France

[21] Appl. No.: 227,223

[22] Filed: Jan. 22, 1981

[30] Foreign Application Priority Data

Jan. 22, 1980 [FR] France ............................. 80 01350

[51] Int. Cl.³ .......................................... G06F 13/00
[52] U.S. Cl. .................................................. 364/200
[58] Field of Search ....................... 364/200, 900, 300

[56] References Cited

U.S. PATENT DOCUMENTS

| | | | |
|---|---|---|---|
| 3,825,902 | 7/1974 | Brown et al. | 364/200 |
| 4,001,783 | 1/1977 | Monahan et al. | 364/200 |
| 4,034,349 | 7/1977 | Monaco et al. | 364/200 |
| 4,047,161 | 9/1977 | Davis | 364/200 |

Primary Examiner—James D. Thomas
Assistant Examiner—David Y. Eng
Attorney, Agent, or Firm—Lowe, King, Price & Becker

[57] ABSTRACT

Attempts in a data processing system to requisition a process able to have critical section operating phases by means of asynchronous trap(s) are arbitrated. Each time the process enters a critical operating phase, an indicator denoting occupation of a corresponding critical classification is set at one. Each time the process emerges from a critical operating phase the indicator for occupation of the corresponding critical classification is reset to zero. At each asynchronous trap, a trap presence indicator corresponding to the capability of the trap is set to one. Upon arrival of an asynchronous trap, the trap presence indicator corresponding to the capability of the asynchronous trap is set to one. Every time an asynchronous trap is complied with, the asynchronous trap presence indicator corresponding to the fulfilled asynchronous trap is reset to zero. Within an arbitration network, the levels of the critical classifications corresponding to the armed critical classification occupation indicators are confronted with the capabilities of the asynchronous trap presence indicators. The arbitration network authorizes discharge of the asynchronous traps of which the allocated capability overcomes the armed critical classification.

6 Claims, 17 Drawing Figures

|  | OCTET 0 | OCTET 1 | OCTET 2 | OCTET 3 |
|---|---|---|---|---|
| MOT-10 | | | | |
| MOT-9 | | | | |
| MOT-8 | | | | |
| MOT-7 | | | | |
| MOT-6 | | | | |
| MOT-5 | | | | |
| MOT-4 | | | | |
| MOT-3 | | | | |
| MOT-2 | | | | |
| MOT-1 | | | | |
| MOT 0 | CAP | PRI | | |
| MOT 1 | | | | ATQR |
| MOT 2 | | | | |
| MOT 3 | | | | |
| MOT 4 | | | | |
| MOT 5 | | | | |
| MOT 6 | | | | |
| MOT 7 | | | | |
| MOT 8 | | ICW | | |
| MOT 9 | | | | |
| MOT 10 | | | | |
| MOT 11 | | | | |
| MOT 12 | | | | |

FIG.1a

|        | OCTET 0 | OCTET 1 | OCTET 2 | OCTET 3 |
|--------|---------|---------|---------|---------|
| MOT 13 |         |         |         |         |
| MOT 14 |         |         |         |         |
| MOT 15 |         |         |         |         |
| MOT 16 |         |         |         |         |
| MOT 17 |         |         |         |         |
| MOT 18 |         |         |         |         |
| MOT 19 |         |         |         |         |
| MOT 20 |         |         |         |         |
| MOT 21 |         |         |         |         |
| MOT 22 |         |         |         |         |
| MOT 23 |         |         |         |         |
| MOT 24 |         |         |         |         |
| MOT 25 |         |         |         |         |
| MOT 26 |         |         |         |         |
| MOT 27 |         |         |         |         |
| MOT 28 |         |         |         |         |
| MOT 29 |         |         |         |         |
| MOT 30 |         |         |         |         |
| MOT 31 |         |         |         |         |
| MOT 32 |         |         |         |         |
| MOT 33 |         |         |         |         |
| MOT 34 |         |         |         |         |
| MOT 35 |         |         |         |         |
| MOT 36 |         |         |         |         |
| MOT 37 |         |         |         |         |
| MOT 38 |         |         |         |         |
| MOT 39 |         |         |         |         |
| MOT 40 |         |         |         |         |
| MOT 41 |         |         |         |         |
| MOT 42 |         |         |         |         |
| MOT 43 |         |         |         |         |
| MOT 44 |         |         |         |         |

FIG.1b

|  | OCTET 0 | OCTET 1 | OCTET 2 | OCTET 3 |
|---|---|---|---|---|
| MOT 45 |  |  |  |  |
| MOT 46 |  |  |  |  |
| MOT 47 |  |  |  |  |
| MOT 48 |  |  |  |  |
| MOT 49 |  |  |  |  |
| MOT 50 |  |  |  |  |
| MOT 51 |  |  |  |  |
| MOT 52 | CSC 00 | CSC 01 | CSC 10 | CSC 11 |
| MOT 53 | CSC 20 | CSC 21 | CSC 30 | CSC 31 |
| MOT 54 |  |  |  |  |
| MOT 55 |  |  |  |  |
| MOT 56 |  |  |  |  |
| MOT 57 |  |  |  |  |
| MOT 58 |  |  |  |  |
| MOT 59 |  |  |  |  |
| MOT 60 |  |  |  |  |
| MOT 61 |  |  |  |  |
| MOT 62 |  |  |  |  |
| MOT 63 |  |  |  |  |
| MOT 64 |  |  |  |  |

FIG.1c

| 1er OCTET | 2e OCTET | 3e OCTET | 4e OCTET |
|---|---|---|---|
| 0 1 2 3 4 5 6 7 | 0 1 2 3 4 5 6 7 | 0 1 2 3 4 5 6 7 | 0 1 2 3 4 5 6 7 |
| OP | GR | C | |

FIG.9a

| 1er OCTET | 2e OCTET | 3e OCTET | 4e OCTET |
|---|---|---|---|
| 0 1 2 3 | | | |
| MBZ \| WS \| CSL | RSU | | |

FIG.9b

FORMAT OF INSTRUCTION EXCS

FORMAT OF GENERAL REGISTER ASSOCIATED WITH INSTRUCTION EXCS

METHOD AND DEVICE FOR ARBITRATION OF ACCESS CONFLICTS BETWEEN AN ASYNCHRONOUS TRAP AND A PROGRAM IN A CRITICAL SECTION

TECHNICAL FIELD

The present invention relates to data processing systems including multiprocessors and, more particularly, to a method of and apparatus for deciding access to processes performed by asynchronous traps when these processes develop in critical stages.

BACKGROUND ART

A data processing system including multiprocessors is able to carry out several processes at the same time. To enable a utilization system to manage files of processes awaiting implementation, each process has a priority level allocated to it; the highest priority process is the process having the lowest order number, i.e., a zero order number.

While they are being performed, the processes derive demands for service. These demands for service are made either on another process or to the process itself. The demands are referred to as asynchronous requests or traps to indicate that they divert the process in question from its normal development.

When an asynchronous trap is derived by a process, this process (an applying process) is supplied with a procedure that implements the demanded service. The applying process consequently seeks a required process amongst the processes being developed in the processing system. If the required process is in active service, the applying process supplies the required process with a serivce implementation signal and thereby diverts the required process from its normal development.

This processing method has disadvantages. In actuality, if the required process was in a critical stage or section of development, the system is placed in a special situation. The process is said to be in a critical phase when the portion of the program being implemented is located in a critical section, i.e., that this implementation mobilizes a critical resource. A resource is defined as critical if it is the only resource for the system; the resource may only be accessed by one device at a time. At the same time a process takes possession of a critical resource it suspends access to the resource by other processes as long as the process considers the possession to be necessary. If a process of this kind is required, this suspension does not cause the cancellation of the reservation and the resource continues to be inaccessible to the other processes. For example, this situation may cause paralysis of the system if the critical resource is necessary to continue the operation of the other processes.

THE INVENTION

To remedy this situation, the present invention proposes an accessing method and apparatus capable of either:

(1) interrupting the development of the required process located in a critical section so the process can comply with the service demanded by the asynchronous trap, even though a critical resource is immobilized; or (2) continuing the development of the required process in the critical section until the critical resource is released, even though compliance with the service demanded by the asynchronous trap is delayed.

To this end, in the present invention a scale of values is established to denote:

(1) on the one hand, the importance of an asynchronous trap; and (2) on the other hand, the consequences resulting from suspension of a process in a critical section.

A convenient way of establishing this scale of values is to refer to rings protecting access to the process. As described infra in the description of the preferred embodiment of the invention, a programmer is thus able to refer to serial numbers of rings of the process in question. The values of this scale are determined by a two digit number including a decade digit that is the serial number of the ring associated with the value in question and a units digit that is an interpolation within a gap between the ring denoted by the decade digit and a ring of higher serial number.

The programmer allocates to each asynchronous trap a value he estimates as a function of the importance of the service demanded. To each critical section the programmer allocates a value which, for example, is a measure of the consequence of immobilizing the critical resources by the process required to continue operation of the data processing system. In these conditions, when an applying process derives a request for the location of a required process, compliance with the request is subject to a confrontation between a value allocated to the request and values allocated to the critical sections in force for the required process.

If the value allocated to the asynchronous trap is lower than the value allocated to the critical section in force having the lowest allocated value, priority is assigned to the asynchronous trap and the required process is interrupted in favor of the asynchronous trap. On the contrary, for as long as there is a critical section of lower value than the value of the asynchronous trap, the latter trap must await the departure of the process from the critical section or sections. In this case, priority is given to freeing the critical resource.

The present invention also offers the advantage of enabling precise accounting of the prevailing critical sections for processes employing nested programs. As a matter of fact, if a critical section contains a nested program, the nested program may contain one or more critical sections which may, moreover, have different allocated values. One of the critical sections may contain a nested program which also contains a critical section or sections; thereby, with an increase in nesting depth, there may be an increase in the number of open critical sections. For all these critical sections, the corresponding critical resources are immobilized as long as the critical sections are not closed. The presence of nested programs consequently produces the risk of superimposing critical sections. Accounting of the prevailing critical sections makes it possible at all times to ascertain the reserved critical resources; consequently, it is possible at all times for the critical section values to be opposed to a possible asynchronous request.

To this end, an object of the invention is to provide an arbitration method within a data processing system wherein attempts to requisition a process able to have functional phases are placed in a critical section by one or more asynchronous traps.

In accordance with one aspect of the invention, there are defined hierarchical classifications of critical states wherein each of the critical states is defined as a function of the resource or resources causing the critical state. For each of the critical state classifications there is allotted an indicator denoting occupation of the critical state classification, which occupation indicators for the critical state classification are reset to zero prior to performing the process. To each asynchronous trap is allocated a requisitioning capability defined by the utilization system as a function of the status of the asynchronous trap. For each of the requisitioning capabilities there is assigned an indicator denoting the presence of an asynchronous trap. There is defined a hierarchical relationship which establishes a precedence order between the critical state classifications and the requisitioning capabilities of the asynchronous traps. The hierarchical relationship establishes unequivocally in the presence of the asynchronous trap whether this asynchronous request should either be fulfilled or stored with a view to performance upon disappearance of the critical state classifications opposing the performance. During development of the process, each time the progress of the process enters into a critical operational phase, the occupation indicator of the corresponding critical classification is set at one; the occupation indicator for the critical classification is then referred to as armed. Each time the development emerges from a critical functional phase, the occupation indicator of the corresponding critical classification is reset to zero; the occupation indicator of the critical classification is then referred to as disarmed. At each asynchronous trap, the request presence indicator corresponding to the capability of the trap is set at one; the asynchronous request presence indicator is then referred to as occupied.

Upon each arrival of an asynchronous trap, the request presence indicator corresponding to the capability of the asynchronous trap is set at one; the asynchronous trap presence indicator is then referred to as occupied. Every time an asynchronous trap is fulfilled, the asynchronous trap presence indicator corresponding to this fulfilled asynchronous trap is reset to zero; the asynchronous trap presence indicator is then referred to as unoccupied. Within an arbitration network, the critical classification occupation indicators are confronted with the capabilities of the asynchronous traps corresponding to the occupied asynchronous trap presence indicators. The arbitration network authorizes discharge of the asynchronous traps of which the allocated capability overcomes the armed critical classifications.

According to another feature of the method of the invention, the critical classification occupation indicators are formed by add-subtract devices. Each of the add-subtract devices is actuated by instructions for entering a critical section and instructions for emerging from a critical section. Each instruction to enter a critical section increments by one the count of a counter corresponding to its critical classification. Each instruction emerging from a critical section decrements by one the count of the counter corresponding to its critical classification. An add-substract counter is referred to as armed and disarmed if its count exceeds zero and is equal to zero, respectively.

The invention relates to a data processing system for performing the method of the invention. Such a system includes critical classification occupation indicator circuits that indicate the critical classifications occupied by the process being executed. A critical classification circuit indicates occupation of a critical classification state for each critical classification. The critical classification indicator circuits are fed by devices for detecting operation in the critical phase and derive signals supplied to filter circuits of the asynchronous traps. Included are asynchronous traps presence indicator circuits which indicate the waiting asynchronous traps. An asynchronous trap presence indicator circuit indicates the presence of an asynchronous trap for each order level. The trap presence indicator circuits are supplied by the asynchronous trap detecting devices and derive signals supplied to the filter circuits by the asynchronous traps. Also included are asynchronous trap circuits for filtering the asynchronous traps having a higher power or capability than the critical classifications occupied by the process being performed. The filtered asynchronous traps divert the process from its principal task to enable the process to comply with the demands of the service calls.

According to another feature of the invention, critical classification occupation indicator circuits are an add-subtract device for each critical classification. Each add-subtract device has an add input terminal fed by the circuits which detect the instructions for entering the critical stage classifications. A subtract input terminal of each add-subtract device is supplied by the circuits which detect the instructions concerned with emerging from the critical stage classification. The filter circuit is fed by the add-subtract devices that consider a critical classification as (1) occupied if the contents of the corresponding add-subtract device are greater than zero and (2) an unoccupied if the contents of the corresponding add-subtract device are equal to zero.

The invention also relates to data processing systems or the like which are provided with a system for arbitrating access conflicts to the processor corresponding to the preceding features.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIGS. 1a, 1b and 1c are illustrations of an EXTENDED OPERATION CONTROL BLOCK in accordance with the invention;

FIGS. 9a and 9b are respectively illustrations of the format of an instruction for entry into a critical stage ENCS and of a general register allocated to this instruction;

BEST MODE FOR CARRYING OUT THE INVENTION

Figure 2:
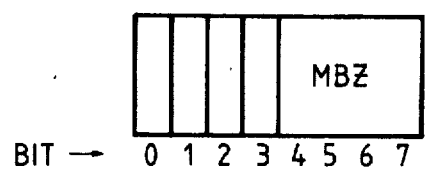
FIG. 2 is an illustration of the contents of OCTET 0 of word MOT 0 of the extended process control block of FIG. 1.

In preparing programs which are to be performed in a data processing system, a programmer divides the program into JOBS, in turn divided into PROCESSES. A process constitutes a set of actions which may be performed by a processor. The operation of the data processing system is performed by an array of circuits and firmware, denoted by the name UTILIZATION SYSTEM. The firmware comprises control instructions contained in a specialized memory, the CONTROL MEMORY, and in a reserved area of the MAIN MEMORY which is not accessible to the programmer. This reserved area of the main memory is referred to in the following description and claims as a COMPLEMENTARY CONTROL MEMORY.

Process displacements are performed in step with the progress of the implementation of the programs. Particular processes must be supplied to a processor while other processes must be suspended and withdrawn from the processor in expectation of an event and other processes must be withdrawn because implementation thereof has been completed. These process displacement operations are performed by a module of the utilization system referred to as the DISPATCHER. To enable the dispatcher to fulfill its task, the utilization system forms, for each process, a logic block referred to as PROCESS CONTROL BLOCK denoted by PCB. These blocks contain all the information items which make it possible to do one of the following:

(1) launch the process into implementation in a processor;

(2) suspend a process while it is being implemented, while retaining the state it has at the instant of suspension; or (3) resume a suspended process.

In a multiprocessor type data processing system, the process control blocks are stored in a complementary control memory because they must be accessible to all the processors. The dispatcher comprises means for gaining access to the process control blocks. The operation of the dispatcher is described in existing literature. One embodiment of a dispatcher is described in French patent application No. 79 30332, filed Dec. 11, 1979 and commonly owned with the present invention. In the preferred embodiment of the invention, the processors are banalized, i.e., there is no master processor having reserved access to the dispatcher. In contrast, in the prior art system, the first available processor takes possession of the dispatcher.

One of the means of the present invention involves extending the process control block to store complementary data that can inform the dispatcher of the situations of the process at the level of the critical classifications and at the level of the asynchronous traps which have reached the process.

In FIGS. 1a, 1b and 1c is illustrated an EXTENDED PROCESS CONTROL BLOCK that includes 65 data words MOT 0-MOT 64, each including four octets (eight bit bytes), OCTET 0-3. Only data that have a direct bearing on the present invention are indicated to simplify the present description. Words MOT 10 and 13 of the process control block PCB are illustrated in FIG. 1a. Words MOT 10-1 form a preamble containing data relating to the characteristic periods of the utilization of the process. Word MOT 0 contains two octets applicable to the invention; capacity (CAP) octet 0 of MOT 0, depicted in detail in FIG. 2, specifies whether or not the process control block is extended. Priority (PRI) octet 1 of MOT 0 depicted in FIG. 3, contains data relating to the priority of the process, among other things. Word MOT 1, ATQR octet 3, depicted in FIG. 4, indicates asynchronous trap flags for a critical section. Words MOT 4 and 5 define an address space that is set aside for the process. Instruction counter (ICW) MOT 8 stores the contents of the INSTRUCTION COUNTER either at the instant the process starts or at the instant the process stops, as the case may be. The bits of MOT 8 consequently are the data to be loaded into a processor instruction counter when the process is started or restarted. MOT 8 is important to the invention since it indicates a PROCESS RING NUMBER (PRN) which defines the process access rights.

Words MOT 13-44 of process control block PCB are illustrated in FIG. 1b such that words MOT 13-20 store the contents of eight BASE REGISTERS of the process. In the preferred embodiment of the invention, these eight base registers are transferred into SCRATCH PAD UNITS (SPU) at the instant the process is started or restarted. Scratch pad unit memory SPU includes base registers RB0, RB1 . . . RB8 that are located at addresses 0, 1 . . . 8 of the scratch pad memory. There is one SCRATCH PAD UNIT MEMORY (SPU) per processor; scratch pad unit memories SPU0, SPU1 . . . SPUN are allocated to processors 0, 1 . . . N, respectively. Words MOT 21-36 store the contents of sixteen GENERAL REGISTERS (RG0, RG1 . . . RG15) of the process. These sixteen general registers are equally transferred into the scratch pad unit of the processor when the process is started and restarted. General registers RG0, RG1 . . . RG15 are respectively located at addresses 9, 10 . . . 25 of MOTS 21-36; MOTS 21-36 include sixty-four addresses such that MOT 21, octet 0, is address 0 and MOT 36, octet 3, is address 63. MOTS 37-44 store the contents of four SCIENTIFIC REGISTERS, each having a length of two words. The scientific registers can be equally transferred into addresses 26 to 33 of the scratch pad unit.

FIG. 1c is an illustration of words MOT 45 to 64 of the PROCESS CONTROL BLOCK wherein words 45, 46 and 47 store exception messages derived by an EXCEPTION HANDLER module of the utilization system. The exception messages facilitate recovery of faulty operations. The words 48-51 contain parameters relating to the implementation time of the process. MOTS 52 and 53 contain eight eight bit NESTED CRITICAL SECTION counters CSCij, respectively CSC00, CSC01, CSC10, CSC11, CSC20, CSC21, CSC30, CSC31. Indices i and j in CSCij respectively denote a ring allocated to the critical section and density of the critical section in the ring. The significance of these indices will be apparent infra. The nested counters account for the number of INSTRUCTIONS FOR ENTERING A CRITICAL SECTION encountered, as well as the number of INSTRUCTIONS FOR EMERGING FROM A CRITICAL SECTION. As described infra, at the derivation times of each order to enter into a critical section and of each order to emerge from a critical section, the programmer should allocate a CRITICAL STATE CLASSIFICATION represented by indices i and j. Every time the processor encounters an order to enter into a critical section, it adds a count to the count of the counter SCSij corresponding to the critical level of this order. Because counter CSCij is always set to zero at the beginning, the counter measures the nested depth of the critical spaces. This nesting concept is described infra. If the contents of counter CSCij are equal to zero, the program is not in a critical classification section ij. Because the critical section counters CSCij have a one octet capacity, they have a maximum counting capacity of 256. Words MOT 54-64 are words placed in reserve for a subsequent process seeking application.

FIG. 2 is an illustration of capacity OCTET 0, MOT 0, which is arranged so bit 0 thereof is applicable to the accounting of the process; bit 1 is applicable to the utilization of the scientific devices; bit 2 defines the type of process control block in question. If bit 2 is a zero, the process control block is not extended, whereby words 45 and 64 do not exist. If bit 2 is a one, the process control block is of the extended type. This arrangement enables the utilization system to perform programs even if they do not exploit the extended mode, which is advantageous for programs written for earlier machines.

MUST BE ZERO (MBZ) bits 4-7 of MOT 0, OCTET 0, are parity bits for the octet: for MOT 0, OCTET 0, to be accepted by the utilization system, bits 4-7 must all be equal to zero. If the contrary is the case, an error is signalled.

Figure 3:
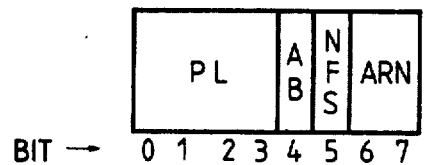
FIG. 3 is an illustration of the contents of OCTET 3 of word MOT 0 of the extended process control block of FIG. 1.

FIG. 3 is an illustration of priority OCTET 1, MOT 0, wherein PRIORITY LEVEL bits 0, 1, 2 and 3 define the priority level of the process in question. ALARM BIT, bit 4, is a flag having a value of 1 if the asynchronous trap service is not opposed by any critical section; NOT FUNCTIONALLY SIGNIFICANT (NFS) bit 5 is not used by the utilization system. ASYNCHRONOUS TRAP RING (ARN) bits 6 and 7 indicate the PRIORITY RING NUMBER of this asynchronous trap when an asynchronous trap is received by the process. The number of the priority ring ARN indicates the priority of the service requested by the asynchronous trap. The service requested is not taken into account unless it has a higher priority than the process being implemented in the processor. Thus, the signal representing the number of the priority ring ARN has a lower value than the signal representing the priority number of the PRN process defined in word 8 of the process control block.

Figure 4:
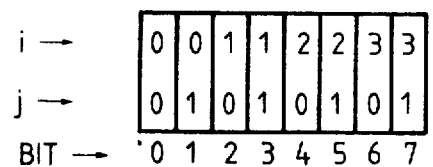
FIG. 4 is an illustration of the contents of OCTET 3 of word MOT 1 of the extended process control block of FIG. 1.

FIG. 4 is an illustration of OCTET 3, MOT 1, which denotes an asynchronous trap flag for critical section ATQR. OCTET 3, MOT 1, contains eight flags, each corresponding to what is referred to herein as an asynchronous trap requisitioning power or capability. The asynchronous traps may have eight different requisitioning capabilities. These capabilities enable arbitration to be performed of conflict situations resulting from attempts to make use of a process operating in a critical stage for an asynchronous trap. The arbitration is performed by comparing the lowest order number of the critical section classification occupied by the process with the status of the asynchronous trap capability. The asynchronous trap is unable to divert the progression of the process for its benefit unless its capability status number is lower than the lowest order number of the critical section classifications.

The requisitioning capabilities of the critical section classifications are distributed over four rings, numbered 0-3, so there are two capabilities per ring. Rings 0 and 3 respectively correspond to the highest and lowest requisitioning capabilities; the same rule is applicable to the process access priorities. The ring allocated to an asynchronous trap is illustrated by index i in the first line of FIG. 4. Within each ring there are strong and weak positions respectively having the status numbers 0 and 1. These positions are illustrated by index j in the second line of FIG. 4. Thus, in FIG. 4, bit 0 represents the asynchronous trap flag ATRQ 00 which is alloted to the trap having the highest capability. Bit 0 has a one value if a trap having this capcbility level is present. Bit 0 has a zero value for the contrary case. Bit 1 corresponds to the asynchronous trap flag ATRQ 01, bit 2 to the flag ATRQ 10, bit 3 to the flag ATRQ 11, bit 4 to the flag ATRQ 20, bit 5 to the flag ATRQ 21, bit 6 to the flag ATRQ 30 and bit 7 to the flag ATRQ 31.

Figure 5:
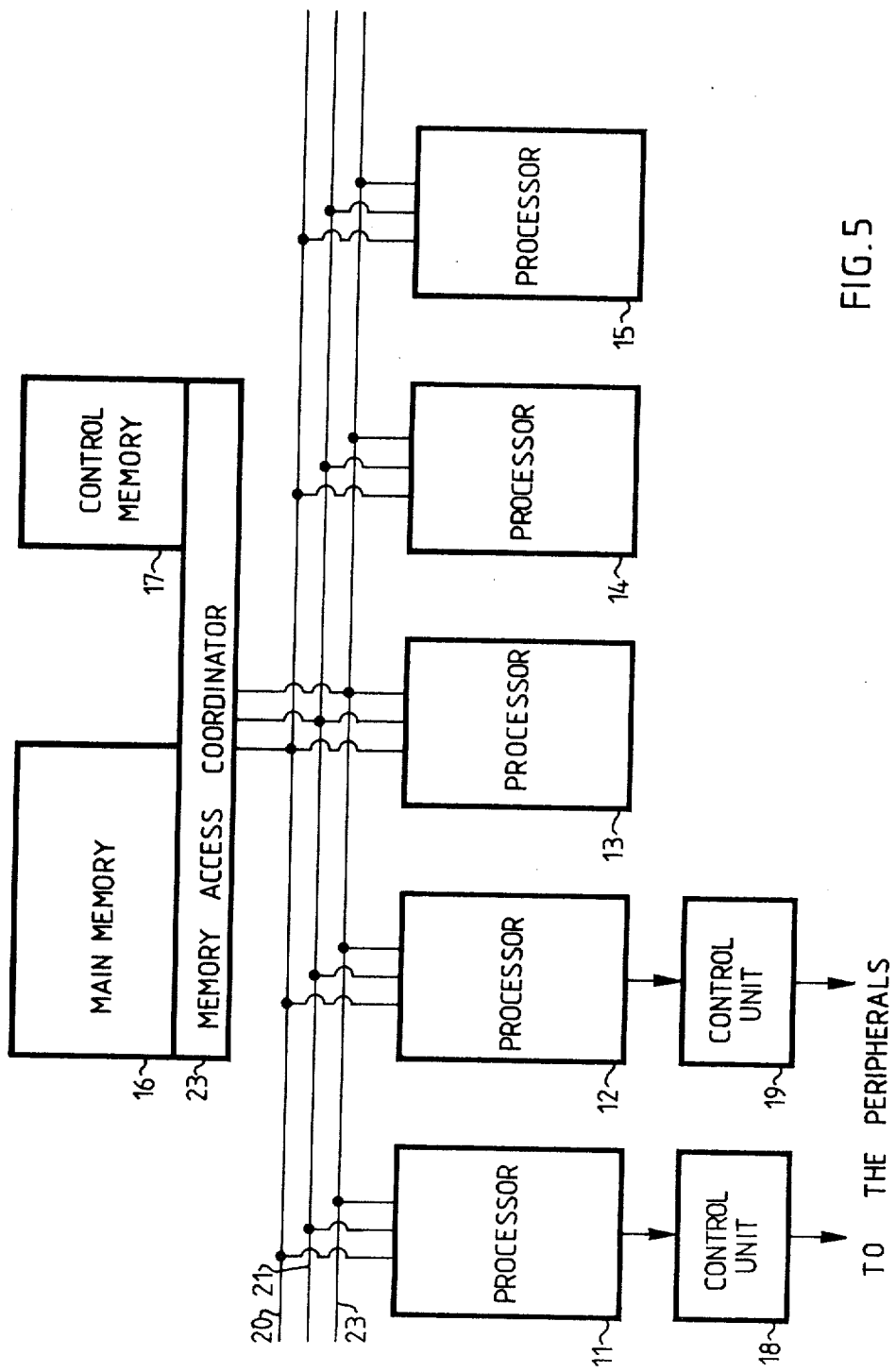
FIG. 5 is a block diagram of a data processing system utilizing multiprocessors in accordance with the preferred embodiment of the invention.

FIG. 5 is a block diagram illustration of a data processing system based on multiprocessors in accordance with a preferred embodiment of the present invention. This is a data processing system comprising processors and banalized exchange units of the type specificed in paragraph 2.3.5.3., page 335 of chapter 12, of the book by M. Jean-Pierre Meinadier entitled "Structure and Operation of Computers", published by Larousse in the *Informatique Series* in the *Sciences Humaines et Sociales* collection.

The system comprises a main memory 16 which stores a program and data required for operation of processors 11-15. A complementary control memory 17 containing control microprograms and associated tables is reserved for the firmware and is not accessible to users. A memory access coordinator 23 performs operations required for the functioning of the main memory 16 and of complementary control memory 17. In particular, this memory access coordinator 23 contains locks which enable any of processors 11-15 to reserve access to tables of the system for itself. Two peripheral processors 11 and 12 are associated respectively with peripheral control units 18 and 19. Any number of additional processing processors 13, 14 and 15 may be selected.

The type of data processing system illustrated in FIG. 5 is mentioned in the Meinadier work as follows: "This banalization is made possible by means of an interruption unit which groups the whole of the interruptions coming from the processors and exchange units (exclusive of divertions caused by program errors which are specific to the different processors). Thus, if an interruption occurs, its priority is compared to that of the program having the lower priority and in course of being implemented in the processors. If the priority of the interruption is greater than that of this program, the processor implementing this latter is interrupted to take up the program associated with the interruption; in the contrary case, the interruption is placed in abeyance."'- 'One and the same program may, by the action of interruption, find its implementation begun in a processor, then be interrupted by a program of higher priority, and then resumed by another processor which has completed a job."

The FIG. 5 system is not controlled by a particular processor. Because the system is re-entrant and subject to particular interlocks, it may, if appropriate, be dealt with simultaneously by several processors.

Figure 6:
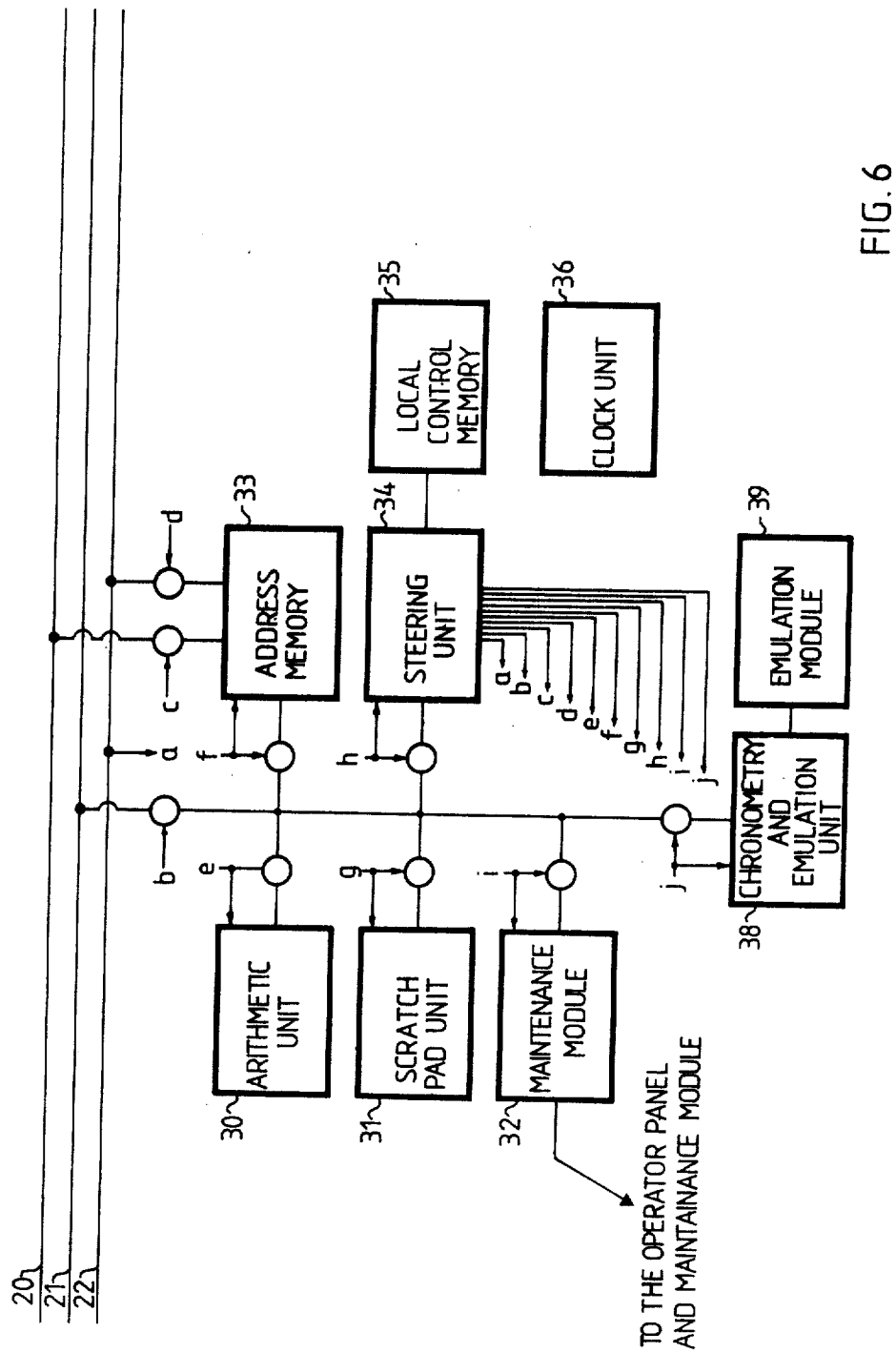
FIG. 6 is a detailed block diagram of one of the processors of the data processing system of FIG. 5.

Reference is now made to FIG. 6, a diagram of one of processor units 11-15. Units 11-15 are interconnected in three ways, viz by: address bus 20 which enables processors 11-15 to address units of the utilization system with which they are required to communicate; a data bus 21 which enables processors 11-15 to transmit and receive data signals to and from another one of units 11-15; and an array of service lines 22.

In the preferred embodiment of the invention, firmware is divided into two categories: collective firmware for the entire system and firmware for the individual processors 11-15. The collective firmware is stored in complementary control memory 17. It enables actuation and verification of the system and contains the microprograms for managing the system and the associated tables. The individual firmware for processors 11-15 is contained in control memories associated with each of these processors.

Each processor 11-15 contains the addresses of the process control blocks relating to the operations they are scheduled to perform. These addresses are supplied to processors 11-15 by a module of the utilization system referred to as the DISPATCHER (not shown). Any process may read all or part of a process control block in order to obtain the contents of the words of interest to it. This is particularly the case at the time when a process is supplied to a processor to execute or resume implementation of the process. As has been stated earlier, each of processors 11-15 performs, inter alia, the following tasks:

(1) loading of its eight base registers;
(2) loading of its sixteen general registers;
(3) loading of its eight double scientific registers;
(4) loading of its instruction counter register.

To this end, each of processors 11-15 uses address bus 20, data bus 21 and service lines 22. Conversely, any of processors 11-15 may modify all or part of the contents of a control block by accessing complementary control memory 17 while the memory is in the write mode.

FIG. 6 is an illustration in diagrammatical form of any one of the processors 11-15. The processor illustrated in FIG. 6 includes an arithmetic and logic unit 30 intended to perform the arithmetic and logic operations on data signals supplied to the processor. Scratch pad unit 31 contains eight base registers, sixteen general registers, eight scientific registers and different job registers used by arithmetic unit 30 while the arithmetic unit is performing processing or safeguarding operations. A link for communicating between an operator panel (not shown) and maintenance module 32 of the processing system is provided. A link for steering access to external address memory 33 which supplies address signals to address bus 20 is also provided; this same link feeds service signals to memories 16 and 17 via service lines 22. A processor steering unit 34 is connected to the local control memory 35.

Unit 34 decodes the instructions of the program to be performed and derives microprograms required for implementation of the decoded instructions. The microinstructions contained in these microprograms are themselves decoded and translated by unit 34 into orders which are transmitted via one or more leads a, b, c, d, e, f, g, h, i, j to the units 11-15 in question. The operation of unit 34 and of the controlled circuits in the unit is described in the book of M. Samir Husson entitled "Microprogramming—Principles and Practices", published by Prentice-Hall. The processor of FIG. 6 also includes a chronometry and emulation unit 38 which may, if appropriate, be connected to an optional emulation module 39. Clock unit 36 supplies the different timing signals to the remaining units of the FIG. 6 processor.

Figure 7B:
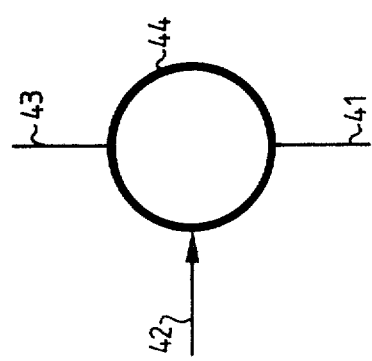
FIGS. 7a and 7b are diagrams of symbols used in FIG. 6.
Figure 7A:
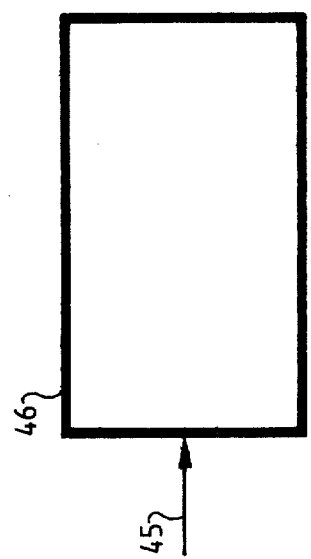

In FIGS. 7a and 7b are illustrated symbols utilized in FIG. 6. The symbol of FIG. 7a denotes that lead 42 controls and verifies transmission between leads 41 and 43. The symbol of FIG. 7b indicates that lead 45 controls and verifies internal operations of unit 46.

Figure 8:
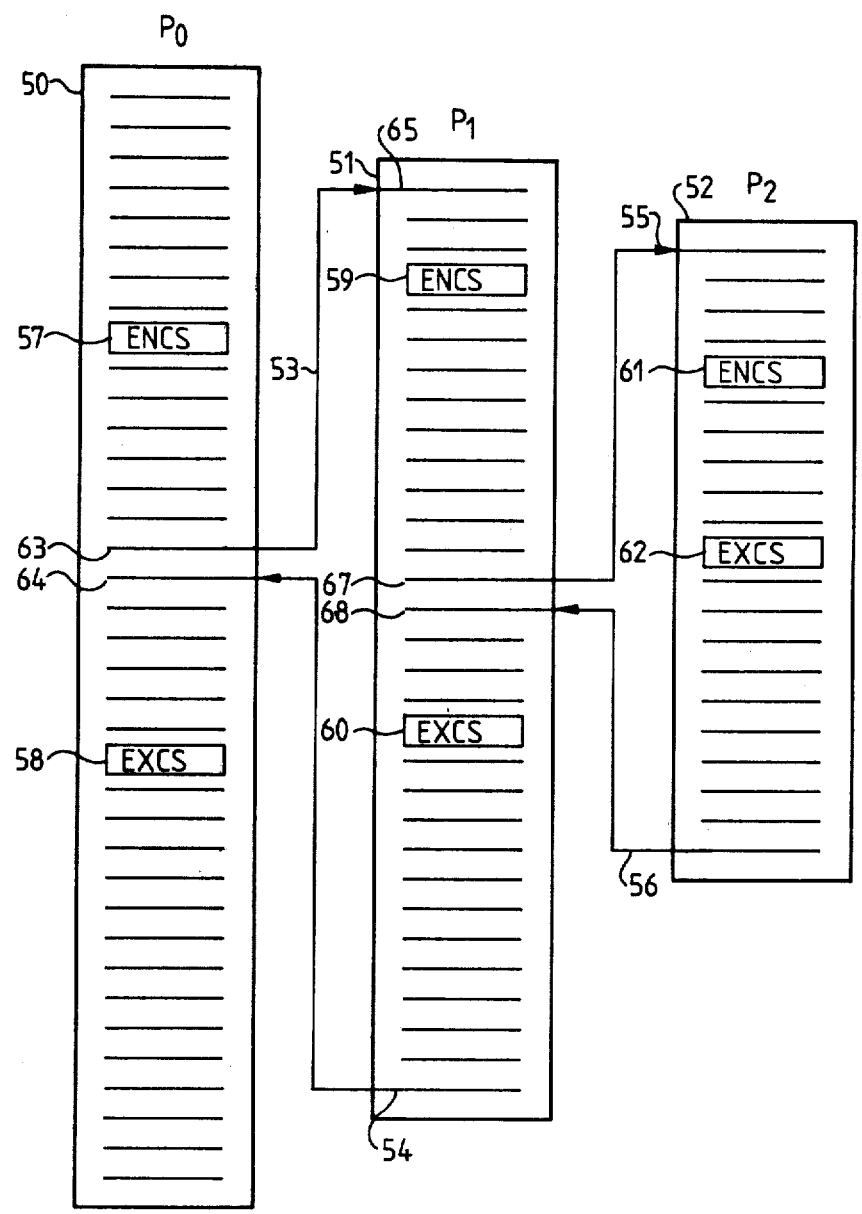
FIG. 8 is a symbolic diagram of the development of nested programs having critical sections.

FIG. 8 is a symbolic illustration of the development of exemplary nesting programs P0, P1, P2, respectively bearing reference numerals 50, 51 and 52. Each of programs 50, 51 and 52 includes an enter critical section instruction ENCS and an emerge from critical section instruction EXCS such that instructions ENCS for programs 50, 51 and 52 are respectively at points 57, 59 and 61, while instructions EXCS are respectively at points 58, 60 and 62. It is assumed that program 50 is being executed in a processor. At point 57, program 50 must use a critical resource of the data processing system; a critical resource is a one of a kind resource of the entire data processing system that the process is attempting to monopolize. At point 57, the programmer has placed an ENTER CRITICAL SECTION instruction ENCS in program 50. The programmer has allocated indices i and j to instruction 57. Indices i and j enable the programmer to define the status of the critical section; indices i and j respectively correspond to a ring number and the density within the ring. The index i is selectively any of the values 0, 1, 2 or 3 for the rings trying to gain access to process use; the greatest protection corresponds to ring 0 and the weakest protection to ring 3. The index j may have a value of 0 or 1, so it is possible to interpolate the importance of a critical section between two rings. Thus, a critical section having an index 10 is of greater capability than a critical section having an index of 11, although both these critical sections are situated in ring number 1.

An important rule in allocating indices to sections is that the index i may under no circumstances be lower than the process index borne by the critical section; thus, a process having a ring number 1 may comprise only critical sections of rings 1, 2 or 3. This numbering of the importance or capability of a critical sections makes it possible to arbitrate conflicts in diverting process 50 by an asynchronous trap for the purpose of performing a service. The asynchronous traps are similarly provided with a requisitioning capability, as described supra. This requisitioning capability is measured by two indices i and j; the index i corresponds to a ring number and the index j corresponds to a binary density value that is either zero or one. The asynchronous traps are consequently endowed with a requisitioning capability measured on a scale which may be superimposed on a magnitude scale of the critical sections.

The arbitration rule in case of conflict is that the process in a critical phase condition, that is a process developing in critical sections, does not abandon its principal task to comply with an asychronous trap, except in the case in which both of the indices i and j allocated to the asychronous trap are lower than both of the indices i and j of the prevailing critical stages. For example, the programmer has placed at point 57 of program 50 an enter critical section instruction ENCS to which he has allocated indices i and j. After point 57, program 50 develops in a critical section. During the development of program 50 after point 57, a call to program 51 occurs at point 63. Control over the processor previously executing program 50 is now assured by program 51 at point 57 but critical phase ij is still valid.

During the development of program 51 there is another enter critical section instruction at point 59 which is assumed to have the same indices i and j as indices i and j of the enter critical section instruction at point 57. Programs 51 and 52 then evolve in the critical section stage with another set of indices i and j having a nesting depth equal to two since the processor has encountered two enter critical section instructions at points 57 and 59. The program 51 continues until point 67 where an instruction calling for program 52 is located. Program 52 consequently assumes control over the processor, with the operation continuing in a critical section with indices i and j having a nesting depth of order 2.

At point 61 is located an enter critical section instruction ENCS having indices i and j identical to the indices of enter critical section instructions at points 57 and 59; thus, at point 63 the nesting depth of the critical section increases to three. At point 62 an emerge from critical section instruction EXCS having the same indices i and j as those of the enter critical section instruction ENCS 62 reduces the nesting depth of the critical section to return the nesting depth to two. The emerge from critical section instruction at point 62 causes program 52 to emerge from the critical section and consequently cancels the effect of the enter critical section instruction ENCS at point 61. Program 52 then continues to point 56, where a return instruction of program 52 restores control over the processor to program 51. Program 51 resumes control over the processor at point 68, one instruction removed from point 67 where program 52 took control over the processor. The evolution of program 51 consequently resumes at point 68 and continues until the processor encounters an emerge from critical section instruction EXCS at point 60.

The emerge from critical section instruction EXCS at point 60 causes program 51 to emerge from its critical section, causing the nesting depth of the critical section ij to return to one. Program 51 continues to evolve until the instruction at point 54 is reached, which instruction actuates a return to program 50. Implementation of program 50 resumes at point 64 and continues to point 68 where an emerge from critical section instruction EXCS causes the program 50 to emerge from its critical section. The nesting depth of the critical section is then zero and the process has emerged completely from the critical implementation stage.

In this example, critical sections of identical classification (i,j) were selected to facilitate explanation, but the critical sections may assume different classifications among the eight possible classifications (00, 01, 10, 11, 20, 21, 30, 31). In the case of different classifications, the nesting depth is measured classification by classification.

The preceding explanations demonstrate that the nesting depth measurement of the critical sections easily renders it possible to follow the program of a process in the critical state. This nesting depth measurement is easily obtained by supplying an adder-subtractor with incrementing enter critical section signals ENCS and with decrementing emerge from critical section signals EXCS. One adder-subtractor is provided for each critical section classification. In the preferred embodiment of the invention, these adder-subtractors are registers CSC 00, CSC 01, CSC 10, CSC 11, CSC 20, CSC 21, CSC 30 and CSC 31, which are located in the process control block at words MOT 52 and 53, FIG. 1c. Each time the processor evolving the process encounters an enter critical section instruction ENCS, the processor increments by a count of one the contents of the adder-subtractor CSCXX corresponding to the classification of this enter critical section instruction EXCS.

As illustrated in FIG. 9b, the general register allocated to the ENCS instruction stores thirty-two bits which are formatted into four eight bit bytes or octets. MUST BE ZERO (MBZ) bit 0 of the first octet must perforce be zero. WEAK/STRONG (W/S) bit 1 of the first octet defines the degree of critical classification within the ring allocated to the critical section. There are four possible ring numbers from 0 to 3; ring 0 is the most highly protected ring while ring 3 is the least protected ring. This derives from the mode of operation of the ring devices for protection by the ring method.

Figure 10:
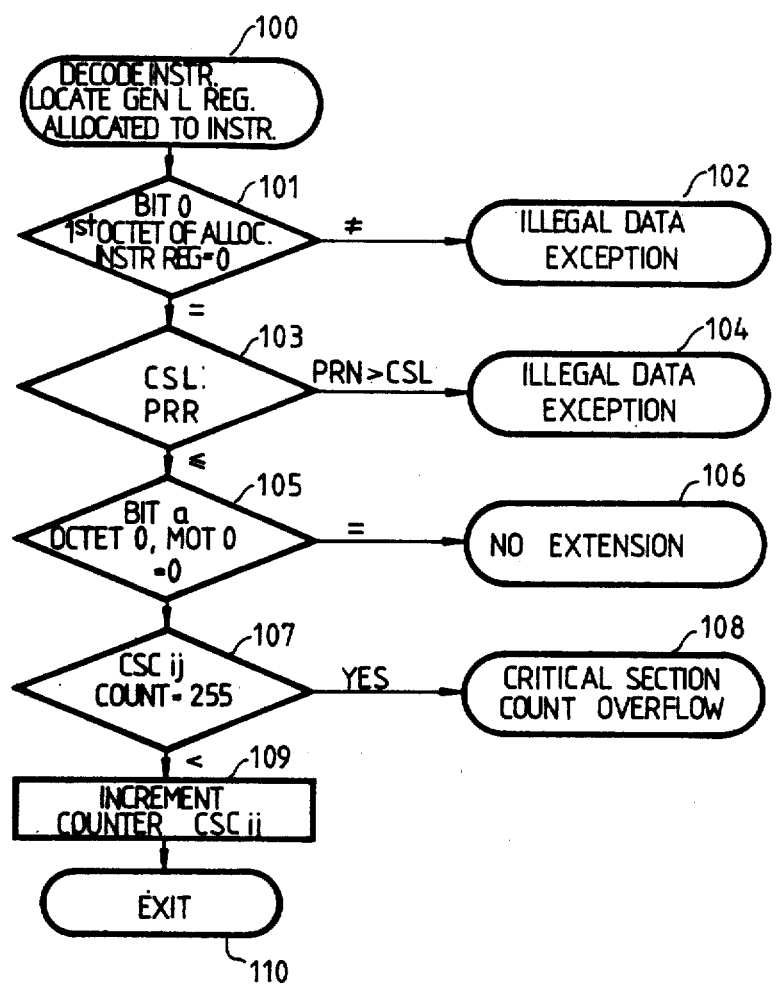
FIG. 10 is a flow diagram of the development of an instruction for entry into a critical stage ENCS.

A flow sequence diagram of the ENCS instruction is illustrated in FIG. 10. During operation 100, the input into the instruction program, the instruction is decoded and the general register allocated to the instruction is located. Immediately thereafter, during operation 101, the firmware determines whether bit 0 of the first octet of the general register allocated to the instruction is actually equal to zero; this is a format conformity verification. If bit 0 of the first octet differs from zero, an illegal data exception signal is derived during operation 102. If this bit is equal to zero, the check on the format conformity has been satisfied and the instruction evolvement steps to operation 103.

During operation 103, the firmware verifies the compatibility of the ring allocated to this critical section. This ring is defined by bits 2 and 3 of the first octet of the general register allocated to the instruction, as described supra and illustrated in FIG. 9b. It is to be recalled that the ring number corresponds to index i in the designation of the CSCij counters. As stated earlier, there is a requirement that the ring number allotted to the critical section may not have a value less than the value of the process ring number PRN, where PRN is the number of the ring for protection of the process being executed. Consequently, during operation 103, the firmware compares the critical section index (denoted by CSL in FIG. 9b) with the process protection number PRN. If the index number CSL of the critical section is lower than the number of the ring for protection of the process, PRN, an illegal data exception signal is derived during operation 104. If the critical section index number CSL is greater than or equal to the process protection ring number PRN, the instruction is recognized as conformed and the program continues to operation 105.

In operation 105, the firmware verifies if the process control block PCB contains an extension, i.e., whether block PCB includes words 52 and 53 that include the eight counters CSC 00, CSC 01, CSC 10 . . . , illustrated in FIG. 2b. To this end, the firmware checks on the state of the bit 2 of octet 0, MOT 0, of the process control block PCB. If this bit has a zero value, process control block PCB does not contain an extension, and consequently does not contain counters CSC 00, CSC 01. In this case, a PCB extension feature exception signal is derived during operation 106 to denote the absence of an extension of the process control block PCB. If bit 2 of octet 0, MOT 0, has a one value, the process control block PCB contains, amongst others, the eight counters CSC 00, CSC 01, CSC 10 . . . , and the program steps to operation 107.

During operation 107, the firmware verifies whether the counter CSCij defined in the ENCS instruction has reached its maximum capacity. Each of counters CSCij is an eight bit counter and therefore has a maximum count of 255. The firmware consequently reads the contents of the counter CSCij corresponding to the instruction; and compares this to the number 255. If the contents of the counter CSCij are equal to the number 255, the counter is saturated, it is impossible to increase its contents, and a critical section count overflow signal, denoting that the capacity of the critical section counter is exceeded, is derived during operation 108. If the count of counter CSCij is lower than the number 255, it is possible to increase the count and the program steps to operation 109 during which the firmware increments the count of counter CSCij by one. After operation 109 is complete, the instruction program is executed during operation 110.

Figure 11A:
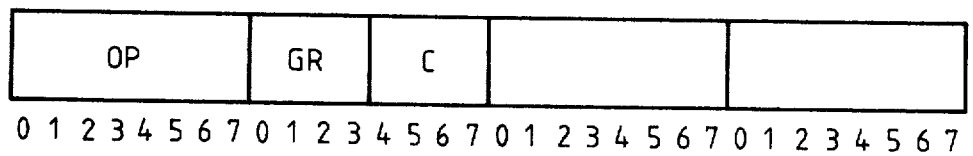
FIGS. 11a and 11b are respectively the format of an instruction for enabling emerging from a critical section EXCS and of the general register allocated to this instructions.
Figure 11B:
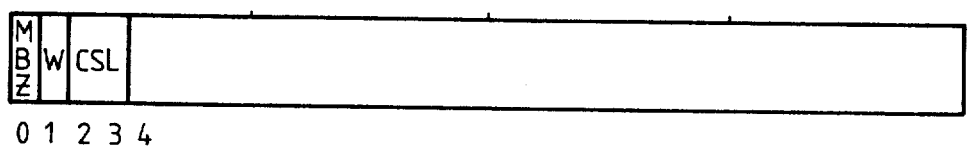

As illustrated in FIG. 11a, an EXCS instruction is formatted to include four octets. The first octet OP of EXCS instruction contains the instruction operating code. Bits 0, 1, 2 and 3 of the second octet, which bits are denoted by GR, represent the number of a general register containing the parameters allocated to the instruction. The format of this general register is described infra and is illustrated in FIG. 11b. This general register is referred to as the general register allocated to the EXCS instruction. Bits 4, 5, 6 and 7 of the second octet, which bits are denoted by C, represent a complementary code allocated to the instruction operating code. The third and fourth octets of the EXCS instruction are not used.

FIG. 11b is an illustration of the format of the general register allocated to the EXCS instruction. MUST BE ZERO (MBZ) bit 0 of the first octet must perforce be equal to nought. WEAK/STRONG (W/S) bit 1 of the first octet defines the degree of the critical classification within the ring allocated to the critical section. If this bit has a zero value, the critical section is very strongly critical (STRONG). If this bit has a value of one, the critical section is moderately critical (WEAK). CRITICAL SECTION LEVEL (CSL) bits 2 and 3 of the first octet define the degree of the ring corresponding to the critical section. There are four possible rings numbered from 0 to 3; ring 0 is the most highly protected ring, while ring 3 is the least protected ring. This results from the operating mode of the devices for protection by the ring method.

Figure 12:
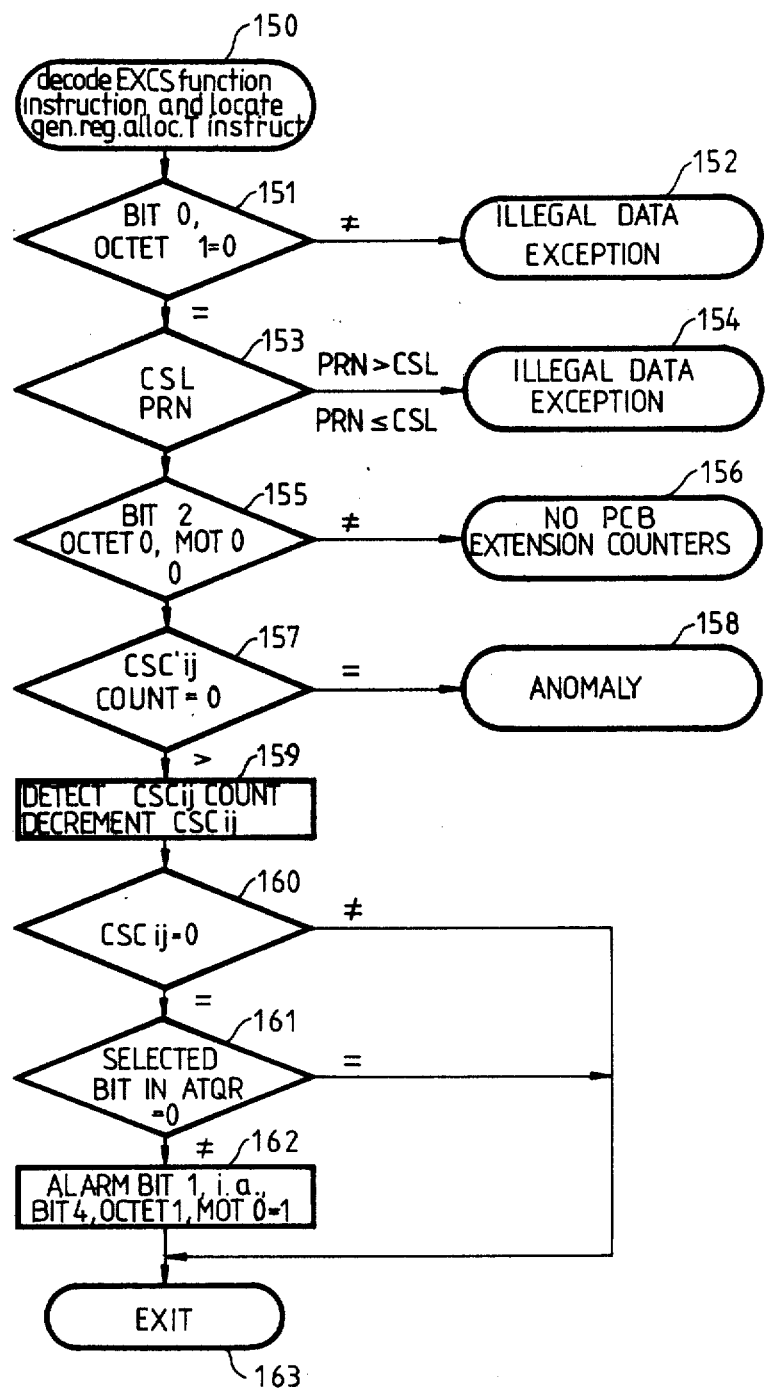
FIG. 12 is a flow diagram of the development of an instruction for enabling emerging from a critical stage EXCS.

As illustrated in FIG. 12, the program performing the EXCS function is entered during operation 150, during which the instruction is decoded and the general register allocated to the instruction is located. The program then steps to operation 151, during which the firmware determines if bit 0 of the first octet of the general register allocated to the instruction is actually equal to zero. This is a format conformity check. If this bit differs from zero, an illegal data exception signal is derived during operation 152. If this bit is equal to zero, the format conformity check is satisfied and the program steps to operation 153.

During operation 153, the firmware verifies the compatibility of the ring allocated to this critical section. This ring CSL is defined by bits 2 and 3 of the first octet of the general register allocated to the instruction, as described supra and illustrated in FIG. 11b. To be compatible, the rank of ring CSL should be greater than or equal to the rank of the process ring number PRN protecting the process being executed. The comparison between PRN and CSL is performed in operation 153. If the rank of the CSL ring is lower than the rank of the PRN of the ring protecting the process, an illegal data exception signal is derived during operation 154. If the rank of the CSL ring is greater than or equal to the rank of the PRN of the ring for process protection, the CSL ring is compatible with PRN and the program steps to operation 155.

During operation 155, the firmware verifies whether the process control block PCB contains an extension, that is whether block PCB includes words 52 and 53 that contain the eight counters CSC illustrated in FIG. 2b. To this end, the firmware determines the state of bit 2 of octet 0 of MOT 0 of the process control block PCB. If this bit has a value of zero, the process control block PCB does not contain an extension and consequently does not include the eight counters CSC. In this case, a PCB extension feature exception signal is derived during operation 158. If bit 2, octet 0, MOT 0, has a value of one, process control block PCB actually includes, among other things, the eight counters CSC, and the program steps to operation 157.

During operation 157, the firmware verifies whether the count of the counter CSCij denoted by the instruction is equal to zero. If the count is equal to zero, the process is not in a critical section. In other terms, the firmware has either encountered as many instructions ENCS for entry into the critical section as have emerged from critical section instructions EXCS, or the firmware has not as yet encountered any enter critical section instructions ENCS. If this condition exists, encountering an emerge from critical section instruction represents an anomaly, and an anomaly signal indicating that the critical section is out of range is derived during operation 158 from the critical section counter. If the contents of the counter are greater than zero, the emerge from critical section instruction is accepted and the program advances to operation 159.

During operation 159, the firmware detects the count of the critical section counter CSCij allocated to the EXCS instruction, while decrementing the counter by a count of one. The program then advances to operation 160 wherein the firmware detects the count of the counter CSCij allocated to the instruction. If these contents differ from zero, the process is still in a critical section and the program advances to exit operation 163 of the EXCS instruction.

If the new count of counter CSCij allocated to the EXCS instruction is detected as equal to zero, during operation 160, it follows that the sequence resulting from the entered EXCS instruction has caused the process to emerge from the critical section. This emergence from the critical section removes the corresponding restrictions imposed on extraneous requisitions. The program then steps the firmware to operation 161 during which the state of the bit corresponding to the ring and the degree of critical classification defined by the EXCS instruction is ascertained by examining the appropriate bit in octet ATQR, octet 3 of WORD 1 of the PCB. If the appropriate bit in octet ATQR has a value of zero, no requisition has been expressed for this ring and this critical classification degree, whereby the program steps to exit operation 163. If the appropriate bit in octet ATQR has a value of one, there is at least one requisitioning call having the same capability at this censure level. Because the censure level is lifted by the nil count of counter CSCij, the program steps to operation 162.

During operation 163, the firmware signals the requisitioning process that the censure on this requisition has been lifted by causing ALARM bit 4 of the PRIORITY octet 1 of MOT 0 of the PCB to have a one value. The ALARM bit enables the requisitioned process to abandon its principal task to take into account the processing of this requisition. Then the program advances to exit operation 163.

While there has been described and illustrated one specific embodiment of the invention, it will be clear that variations in the details of the embodiment specifically illustrated and described may be made without departing from the true spirit and scope of the invention as defined in the appended claims.

I claim:

1. A method of arbitrating attempts in a data processing system to requisition a process able to have operating phases in critical sections, the system including a program, a resource being defined as critical when it is the only resource of its type in the system, an operating phase being in a critical section when a portion of the program of the system being implemented mobilizes a critical resource, a process being defined as operating in a critical mode when the process is monopolizing a critical resource, the arbitrating method being performed in response to one or more asynchronous traps, wherein there are initially: predetermined hierarchical classifications of critical modes, each of said classifications of critical modes being defined as a function of at least one resource causing a process to operate in a critical mode; for each of the critical mode classifications, an indicator denoting occupation of the critical mode classification being allocated, the critical mode classification occupation indicators being set at zero before implementation of the method, each asynchronous trap being allocated a requisitioning capability defined by a utilization system as a function of a status of the asynchronous trap; an asynchronous trap presence indicator being allocated for each of said requisitioning capabilities; a hierarchical relationship being defined according to precedence among the critical mode classifications and the requisitioning capabilities of the asynchronous traps, the hierarchical relationship unequivocally determining in the presence of an asynchronous trap whether this asynchronous trap should either be complied with or stored, with a view to performance of this asynchronous trap upon disappearance of the critical mode classifications tending to prevent the performance of this asynchronous trap; the method being at least partly performed with a system including an arbitration network comprising the steps of operating the system by: setting the indicator denoting occupation of the corresponding critical mode classification to a one state each time the process progresses so it enters into a critical operating phase, said critical mode classification occupation indicator then being defined as armed; resetting the critical classification occupation indicator to zero to indicate occupation of the corresponding critical mode classification, said critical mode classification occupation indicator then being defined as unarmed; in response to the presence of an asynchronous trap, setting the trap presence indicator corresponding to the capability of the asynchronous trap to a state of one, said asynchronous trap presence indicator then being defined as occupied; resetting to zero the asynchronous trap presence indicator corresponding to each executed asynchronous trap each time there is compliance with an asynchronous trap, said asynchronous trap presence indicator being defined as vacant when it is reset to zero; the arbitration network: comparing the levels of the critical mode classifications corresponding to the armed critical mode classification occupation indicators with levels for the capabilities of the asynchronous traps corresponding to the occupied asynchronous trap presence indicators; said arbitration network authorizing discharge of the asynchronous traps having an allocated capability level greater than the armed critical classifications.

2. The method of claim 1 wherein the system includes add-subtract devices, the critical classification mode indicators being indicated by the add-subtract devices, actuating each of the add-subtract devices as the critical section instructions are begun and completed, as each critical section instruction is begun incrementing by a count of one the count of one of the add-subtract devices corresponding to its critical classification, as each critical section instruction is completed decrementing by a count of one the count of the add-subtract device corresponding to its critical classification, an adder-subtract device being defined as armed if the count therein exceeds zero and as disarmed if the count therein is equal to zero.

3. Apparatus for arbitrating attempts in a data processing system to requisition a process able to have operating phases in critical sections, the system including a program, a resource being defined as critical when it is the only resource of its type in the system, an operating phase being in a critical section when a portion of the program of the system being implemented mobilizes a critical resource, a process being defined as operating in a critical mode when the process is monopolizing a critical resource, the arbitrating apparatus performing an arbitration in response to one or more asynchronous traps, wherein there are initially: predetermined hierarchical classifications of critical modes, each of said classifications of critical modes being defined as a function of at least one resource causing a process to operate in a critical mode; for each of the critical mode classifications, an indicator denoting occupation of the critical mode classification being allocated, the critical mode classification occupation indicators being set at zero before implementation of the method, each asynchronous trap being allocated a requisitioning capability defined by a utilization system as a function of a status of the asynchronous trap; an asynchronous trap presence indicator being allocated for each of said requisitioning capabilities; a hierarchical relationship being defined according to precedence among the critical mode classifications and the requisitioning capabilities of the asynchronous traps, the hierarchical relationship unequivocally determining in the presence of an asynchronous trap whether this asynchronous trap should either be complied with or stored, with a view to performance of this asynchronous trap upon disappearance of the critical mode classifications tending to prevent the performance of this asynchronous trap; the apparatus comprising: asynchronous trap filter circuits for filtering signals derived from the asynchronous traps associated with a higher capability than a critical classification occupied by the process being executed, the asynchronous traps filtered by the trap filter circuits diverting the process from a principal task thereof to satisfy demands for service made and transmitted to a utilization system for implementation; critical mode classifications occupation indicator circuits for indicating the critical mode classifications occupied by the process while the process is being implemented, a circuit indicating critical mode classification occupation being provided for each critical mode classification, said critical mode classification indicator circuits being responsive to devices for detecting critical phase operation and deriving signals supplied to the asynchronous trap filter circuits; asynchronous trap presence indicator circuits for indicating which of the asynchronous traps are waiting to be executed, one circuit indicating the presence of an asynchronous trap being provided for each capability level, said trap presence indicator circuits being responsive to devices for detecting the asynchronous traps and deriving signals supplied to the asynchronous trap filter circuits; means for setting the indicator circuits denoting occupation of the corresponding critical mode classification to a one state each time the process progresses so it enters into a critical operating phase and for resetting the critical classification occupation indicator circuits to zero, said critical mode classification occupation indicator being defined as being armed and unarmed when the corresponding critical mode classification is respectively set to the one and zero states, the corresponding critical mode classification indicating occupation of the corresponding critical mode classification when set to zero; means responsive to the presence of an asynchronous trap for setting the asynchronous trap presence indicator circuit corresponding to the capability of the asynchronous trap to a state of one and for resetting to zero the asynchronous trap presence indicator circuit corresponding to each executed asynchronous trap each time there is compliance with an asynchronous trap, said asynchronous trap presence indicator being defined as occupied and unoccupied when set to one and zero, respectively; an arbitration network for comparing the levels of the critical mode classifications corresponding to the armed critical mode classification occupation indicators with levels for the capabilities of the asynchronous traps corresponding to the occupied asynchronous trap presence indicators; said arbitration network authorizing discharge of the asynchronous traps having an allocated capability level greater than the armed critical classifications.

4. The apparatus of claim 3 wherein each critical classification occupation indicator circuit comprises a separate add-subtract device, there being one add-subtract device for each critical classification, each add-subtract device having an increment input terminal responsive to signals derived by detection circuits for instructions to enter the critical classification and a decrement input terminal responsive to detection circuits for instructions derived from the critical section classification, the filter circuit being fed by an output signal of the add-subtract devices indicating a critical classification to be respectively occupied and unoccupied in response to the contents of the corresponding add-subtract device being greater than zero and equal to zero.

5. An arbitration method performed on a data processing system wherein attempts to requisition a process able to have functional phases are placed in a critical section of a program of the system by one or more asynchronous traps, the system having hierarchical classifications of critical modes, wherein each of the critical modes is defined as a function of at least one resource causing a critical mode allotting an indicator denoting occupation of the critical mode classification for each of the critical mode classifications, the method comprising: resetting the critical mode occupation indicators for the critical mode classification to zero prior to performing the process, allocating to each asynchronous trap a requisitioning capability defined by a utilization system as a function of asynchronous trap status, assigning to each of the requisitioning capabilities an indicator denoting the presence of an asynchronous trap, defining a hierarchical relationship which establishes a precedence order between the critical mode classifications and the requisitioning capabilities of the asynchronous traps, the defined hierarchical relationship unequivocally establishing in the presence of a particular asynchronous trap whether the particular asynchronous trap should be either executed or stored with a view to execution of the particular asynchronous trap in response to the critical mode classifications tending to prevent the execution no longer requiring execution, each time a critical operational phase is entered setting the occupation indicator of the corresponding critical classification at one, the occupation indicator for the critical classification then being referred to as armed, each time a critical functional phase is completed resetting the occupation indicator of the corresponding critical classification to zero, the occupation indicator of the critical classification then being referred to as disarmed, in response to each arrival of an asynchronous trap setting the request presence indicator corresponding to the capability of the asynchronous trap at one, the asynchronous trap presence indicator then being referred to as occupied, in response to execution of an asynchronous trap resetting the asynchronous trap presence indicator corresponding to this fulfilled asynchronous trap to zero, the asynchronous trap presence indicator then being referred to as unoccupied, in an arbitration network of the system comparing the critical classification occupation indicators with indicators of the capabilities of the asynchronous traps corresponding to the occupied asynchronous trap presence indicators, and activating the arbitration network to authorize discharge of the asynchronous traps of which the allocated capability overcomes the armed critical classifications.

6. The method of claim 5 wherein the system includes add-subtract devices, the critical classification occupation indicators being formed by the add-subtract devices, activating each of the add-subtract devices in response to instructions commanding an asynchronous trap to leave a critical section, in response to each instruction commanding an asynchronous trap to enter a critical section, incrementing by one the count of one of the add-subtract device corresponding to the critical classification of the commanding instruction, in response to each instruction emerging from a critical section decrementing by one the count of the add-subtract device corresponding to the critical classification of the commanding instruction, each add-subtract device being armed and disarmed in response to a count thereof exceeding zero and being equal to zero, respectively.

* * * * *